United States Patent [19]
Applebaum

[11] Patent Number: 5,510,796
[45] Date of Patent: Apr. 23, 1996

[54] APPARATUS FOR WIND SHEAR COMPENSATION IN AN MTI RADAR SYSTEM

[75] Inventor: Sidney P. Applebaum, Liverpool, N.Y.

[73] Assignee: Martin Marietta Corporation, Syracuse, N.Y.

[21] Appl. No.: 687,922

[22] Filed: Dec. 31, 1984

[51] Int. Cl.⁶ .................................................. G01S 13/534
[52] U.S. Cl. ........................ 342/162; 342/26; 342/159; 342/383; 342/384
[58] Field of Search ........................ 343/7.7, 7 A, 368; 342/159, 160, 162, 368, 383, 89, 26, 154, 384

[56] References Cited

U.S. PATENT DOCUMENTS 3,720,941  3/1973  Ares ........................ 343/7 A
3,806,924  4/1974  Applebaum ........................ 343/7.7
4,121,209  10/1978  ap Rhys ........................ 343/7.7

*Primary Examiner*—Gilberto Barrón, Jr.
*Attorney, Agent, or Firm*—Paul Checkovich; Stephen A. Young

[57] ABSTRACT

The invention relates to apparatus for reducing the masking effect in the doppler frequency domain of wind sheared clutter upon the radar returns of moving targets. The invention consists in forming two beams from the elements of a radar antenna array by means of adjustable complex weights which are then summed. One of the two beams is then delayed by a predetermined amount and added algebraically to the other beam to form a composite beam containing a narrow trough-like depression in beam angle/doppler frequency space. Means are then provided for adjusting the weights to bring coincidence between the depression and the clutter to cause attenuation of the clutter with a minimum reduction in the usable doppler frequency domain.

7 Claims, 10 Drawing Sheets

SIMULATED
INTERFERENCE
UNIFORM
IN SIN$\theta$ SPACE

REL GAIN = -1.105 dB $V_g = 3.0$ m/s
$K = 4.0$ m/s/km
$\sigma^2_{WIEN} = 0.0$ (m/s)$^2$/km
$\sigma_{TURB} = 0.0$ m/s
RESIDUE = 0.014 dB
PK GAIN = 16.777 dB
IMPF = 35.237 dB $V_g$ = 3.0 m/s
K = 4.0 m/s/km
$\sigma^2_{WIEN}$ = 1.0 (m/s)$^2$/km
$\sigma_{TURB}$ = 1.0 m/s
RESIDUE = 15.909 dB
PK GAIN = 16.596 dB
IMPF = 19.162 dB

APPARATUS FOR WIND SHEAR COMPENSATION IN AN MTI RADAR SYSTEM

BACKGROUND OF THE INVENTION

1. Field of Invention

The invention relates to a moving target indicating (MTI) radar system and more particularly to the reduction of the masking effect in the doppler frequency domain of wind sheared clutter upon the radar returns of moving targets.

2. Description of the Prior Art

"Wind sheared" weather and chaff are long standing radar problems, particularly for long range ground based radar. Wind shear is by definition a component of the wind for which the velocity changes with altitude. It is a world-wide and year round phenomenon. Wind shear is the velocity spread of wind borne weather (rain, hail, snow) and chaff particles across a vertical section of the main beam of the radar. This velocity spread causes the doppler spectrum of these particles, which cause radar reflections called "clutter", to spread in the frequency domain and thereby mask a substantial portion of the doppler frequency domain. (The unambiguous doppler frequency domain associated with a pulse—doppler radar is the frequency domain bounded by zero and the PRF (the pulse repetition frequency, which is the reciprocal of the pulse repetition period, T) and through which the doppler frequency induced by the radial speed of the target may range from zero and a maximum established for the system (usually the PRF). In anticipation of weather or chaff, an N-pulse MTI filter may be provided to reject the clutter. Such a filter attenuates both the clutter and any targets having speeds causing joint occupancy of the doppler frequency domain. If for example the clutter occupies 30% of the doppler frequency domain, the unattenuated frequency domain remaining for target detection is limited to 70%.

The doppler frequency spread due to wind shear increases with the frequency of the radar system. In addition, the radar cross section of the weather particles and chaff increase with frequency. Thus, the adverse effect of wind shear increases with RF frequency.

The effect of wind shear also increases with range. The fractional doppler occupancy $f_dT$ (i.e. the doppler frequency spread of the clutter across the main beam multiplied by the pulse repetition period) and denoted here by $v$, may be calculated, assuming a wind shear constant of 4 meters per second per kilometer of altitude directed towards or away from the radar and assuming a 1° radar beam, set at 0° elevation. Calculations indicate that the fractional occupancy $v$ is small in the 50 kilometer range for the 10, 5 and 3 gHz radar bands, being less than 8% at 10 gHz. At 100 kilometers range the fractional occupancies are respectively 30%, 15% and 9%, and thus of serious concern in all three bands. At 150 kilometer range intervals, the clutter occupancy approaches unity at higher frequencies. At longer ranges, the clutter occupancy exceeds unity-meaning that there may be no clutter free doppler frequency domain—even at lower frequencies. In short, wind shear poses a serious problem to all weather radar operation, and means for countering its effect are of great importance.

SUMMARY OF THE INVENTION

Accordingly it is an object of the invention to provide improved means for reducing the adverse affect of clutter in an MTI radar system.

It is another object of the invention to provide means for reducing the adverse affect of clutter driven by wind shear in an MTI radar system.

It is still another object of the invention to provide means for reducing the adverse affect of clutter driven by wind shear with a minimum reduction in the doppler frequency range available for sensing target motion.

These and other objects of the present invention are achieved in a moving target indicating radar system by a novel combination comprising a planar radar antenna array comprising a plurality of radiating elements disposed in a common plane and arranged in horizontal rows and vertical columns; first and second summation means for forming a first and a second receiving beam from the array, each beam being formed by weighting the outputs from rows of the array by adjustable complex weights, and then summing the weighted outputs to form the beam (the two beams thereby originating from phase centers having an adjustable mutual vertical displacement in the plane of the array), and means for delaying one of the beams by a predetermined delay and then adding the delayed and the undelayed beam algebraically to form a composite beam in reception containing a narrow trough-like depression, where vector cancellations occur, in beam-angle/doppler-frequency space.

The combination further comprises means for adjusting the weights to achieve an appropriate vertical displacement of the phase centers to bring the trough-like depression into coincidence with the clutter in beam angle/doppler frequency space to attenuate the clutter with a minimum reduction in the usable doppler domain.

In accordance with a further aspect of the invention, a third beam formation means is provided for determining the position of wind shear driven clutter in beam-angle/doppler frequency space. That position is determined by means of an M pulse doppler filter bank which determines the distribution of the received clutter power in doppler frequency space and from that, the radial velocity component of the wind at the center of the beam and the differential radial velocity due to horizontal wind shear between the upper and lower limits of the beam at the range cell under examination. These two parameters are derived from the first and second moments respectively of the measured clutter power distribution.

In accordance with a further aspect of the invention, an adaptive solution is achieved for causing coincidence of the trough-like depression with clutter in beam angle/doppler frequency space. This involves derivation of covariance matrix of N outputs from N rows of the array and N delayed outputs from the N rows of the array. The weights for clutter reduction are then determined by inverting the covariance matrix of the 2N outputs. The optimum weights are then obtained from a product of the inverted matrix and a vertical steering vector in beam angle/doppler frequency space.

BRIEF DESCRIPTION OF THE DRAWINGS

The novel and distinctive features of the invention are set forth in the claims of the present application. The invention itself, however, together with further objects and advantages thereof may best be understood by reference to the following description and the accompanying drawings, in which:

FIG. 1A depicts the intersection of a range resolution cell of the beam with a portion of the wind shear profile; and FIG. 1B illustrates the variables employed in a model of the wind shear;

FIGS. 3A through 3E illustrate the weights applied to individual now outputs of the array and the effect of these weights upon the directional pattern; FIGS. 3F, G and H are graphs of beam intensity in elevation angle/doppler frequency space. FIGS. 3F and 3G illustrate the characteristics of conventional MTI doppler filters; while FIG. 3H illustrates the characteristics of the invention in compensating for wind shear;

DESCRIPTION OF THE PREFERRED EMBODIMENT

Figure 1A:
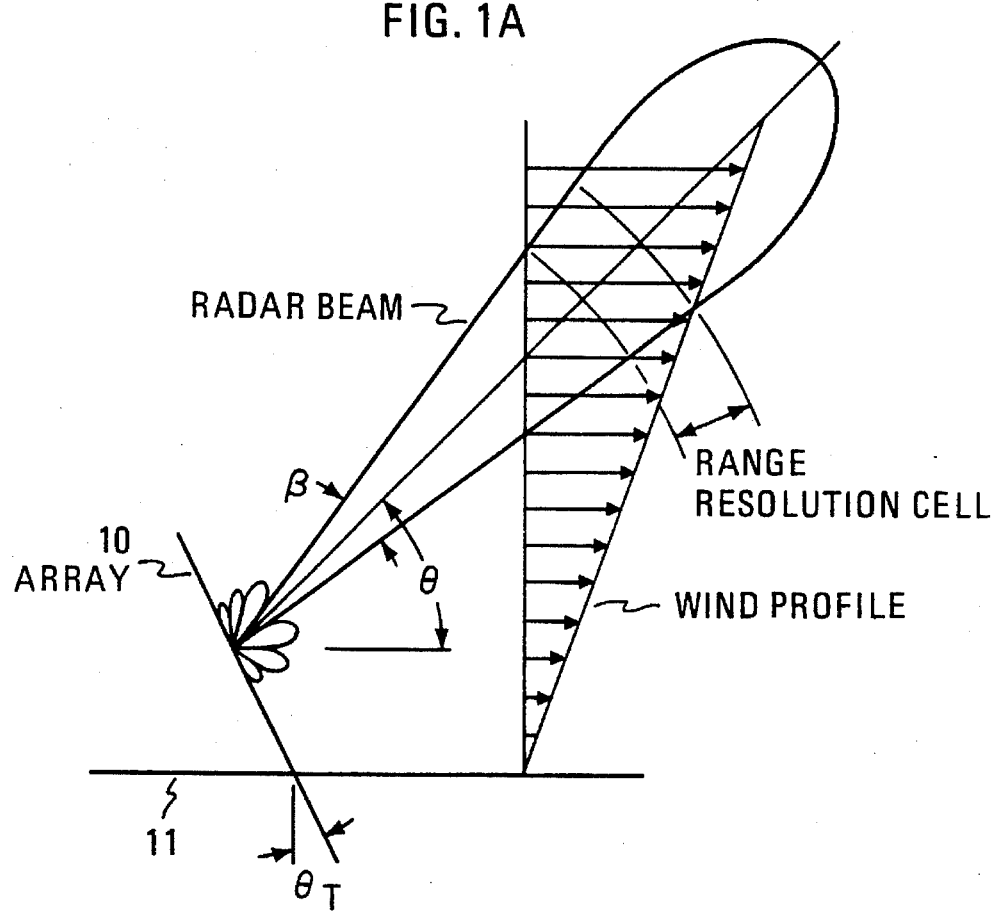
FIGS. 1A and 1B are side elevation views of a radar array antenna directing a beam into a portion of the earth's atmosphere subject to wind shear.

The invention utilizes the principle that an effect equivalent to that produced by wind shear on wind borne particles can be produced in an MTI system by physically moving a receiving antenna in the plane of the antenna. The principle, in its application to an array antenna, may be carried one step further, in that equivalence does not require that the antenna be subjected to physical motion. Instead, the antenna need only be subjected to synthetic motion from an adjustment of the individual electrical weights applied to the outputs from each element of the array during reception.

In an MTI filter configuration, in which a real (complex) signal from an array antenna is combined after a delay with an undelayed signal, recurrent nulls may be produced starting at a predetermined frequency and continuing at equal intervals thereafter. If the radar returns are graphed in doppler frequency through this first unambiguous doppler interval, targets moving at differing speeds will occur at differing positions along the frequency coordinate due to differing doppler frequency shifts attributable to that motion. In the frequency coordinate accordingly, synthetic antenna motion in the plane of the array may be made to produce the effect of wind shear.

The nulls can be "tuned" to occur at desired frequencies (corresponding to the speed of weather clutter) by appropriate adjustment of the complex weights applied to the MTI filter. This allows one to view those portions of the doppler frequency spectrum (and corresponding radial target speed) that one desires to examine. In addition, it allows one to retune the nulls to reoccur at a frequency attributable to interference to eliminate the interference. Alternatively, one may add a notch filter of appropriately wide band width and center frequency to eliminate interference over a wider band of frequencies than may be produced by the simple 2-pulse MTI notch filter just described.

The problem posed by clutter subject to wind shear is that its radial velocity varies in a vertical dimension from the top to the bottom of a radar beam. Thus, if the clutter is to be attenuated by a wide band filter, targets occurring in the same very substantial portion of the doppler domain will be attenuated.

It will be shown that synthetic antenna motion in a vertical plane of an array during reception may be used to produce an effect in the beam angle/doppler frequency space equivalent to the effect of wind shear driven clutter and thereby employed to compensate for it.

In accordance with the invention, the synthetic antenna motion in the MTI antenna system is made in the vertical dimension at a velocity appropriate to the radial velocity variation of the clutter. This synthetic antenna motion has the effect in angle/doppler space of causing a movement in the notch with vertical beam angle produced by the MTI filter from a constant frequency characteristic across the vertical cross section of the beam to a variable frequency linearly dependent on the vertical angle within the beam. If the filter constants are properly adjusted, the narrow notch of the MTI notch filter may be made to coincide with the doppler frequency of the clutter from bottom to top of the beam. With appropriate signal processing, the affected portion of the radar spectrum will be substantially cleared of clutter, and many targets which would have been masked by the clutter (or by broad band filters designed to remove the clutter) are now displayable.

The principles in support of the invention may be explained with reference to FIG. 1A. In FIG. 1A a stationary radar antenna array is depicted in a side elevation view directing a radar beam into a volume of the earth's atmosphere subject to wind shear. The horizontal surface of the earth is represented by the horizontal line 11. The plane of the antenna array is shown at 10 tilted to an angle $\theta_t$ away from the vertical. The main beam of the antenna array is Beta degrees wide (the side lobes are assumed to be small as shown) and the axis of the main beam is electrically steered to an angle ($\theta$) above the horizontal. The wind velocity profile is represented by a succession of horizontal arrows 13 intended to represent the wind shear component toward or away from the antenna and operating across a vertical section of the beam. In particular, the wind is represented as being of zero horizontal velocity upon the surface of the earth and at each increment in elevation, the horizontal velocity increases a comparable increment, thereby increasing linearly to the maximum elevation represented. The model further implies that scattering particles are distributed over the entire volume of the resolution cell being searched. The volume searched would be the volume lying within the beam of the antenna between two slant range limits determined by the system range resolution.

It may be demonstrated that if the plane of the antenna is exactly upright, ($\theta_t=0$), and if the main beam is steered horizontally, ($\theta=0$), then an upward displacement of the antenna at the rate of S meters per second will induce a doppler frequency component on signals scattered back from particles at the upper edge of the beam of $$f_u = \frac{2S}{\lambda} \sin(\beta/2) \quad (1)$$

where "$\lambda$" is the wavelength in meters. This doppler component has a positive sign representing an increase in frequency. The doppler frequency component created at the lower edge of the beam will be as follows:

$$f_l = \frac{-2S}{\lambda} \sin(\beta/2) \quad (2)$$

The expression (2) has a negative value indicating that it is algebraically of a different sign than produced at the upper edge of the beam.

Similarly, assuming that the antenna is horizontally steered and directed toward weather or chaff subject to the wind profile illustrated in FIG. 1A, wind borne particles at the upper edge of the beam will experience a larger downward shift in doppler frequency than particles at the bottom edge will experience. If the signs of the doppler shift attributable to clutter between the upper and lower limits of the beam are improper in relation to the signs of the doppler shift attributable to antenna motion, the direction of antenna motion may be reversed. If the magnitudes of the two effects are different, then one may adjust the relative velocity of movement of the antenna to the point nearest to equivalence. In short, assuming that the relative velocity of the radar and of wind borne particles produced by the wind shear or antenna motion can be subtracted algebraically, antenna motion may be used to compensate for linear wind shear attributable to the horizontal wind component directed toward or away from the radar antenna.

Figure 2:
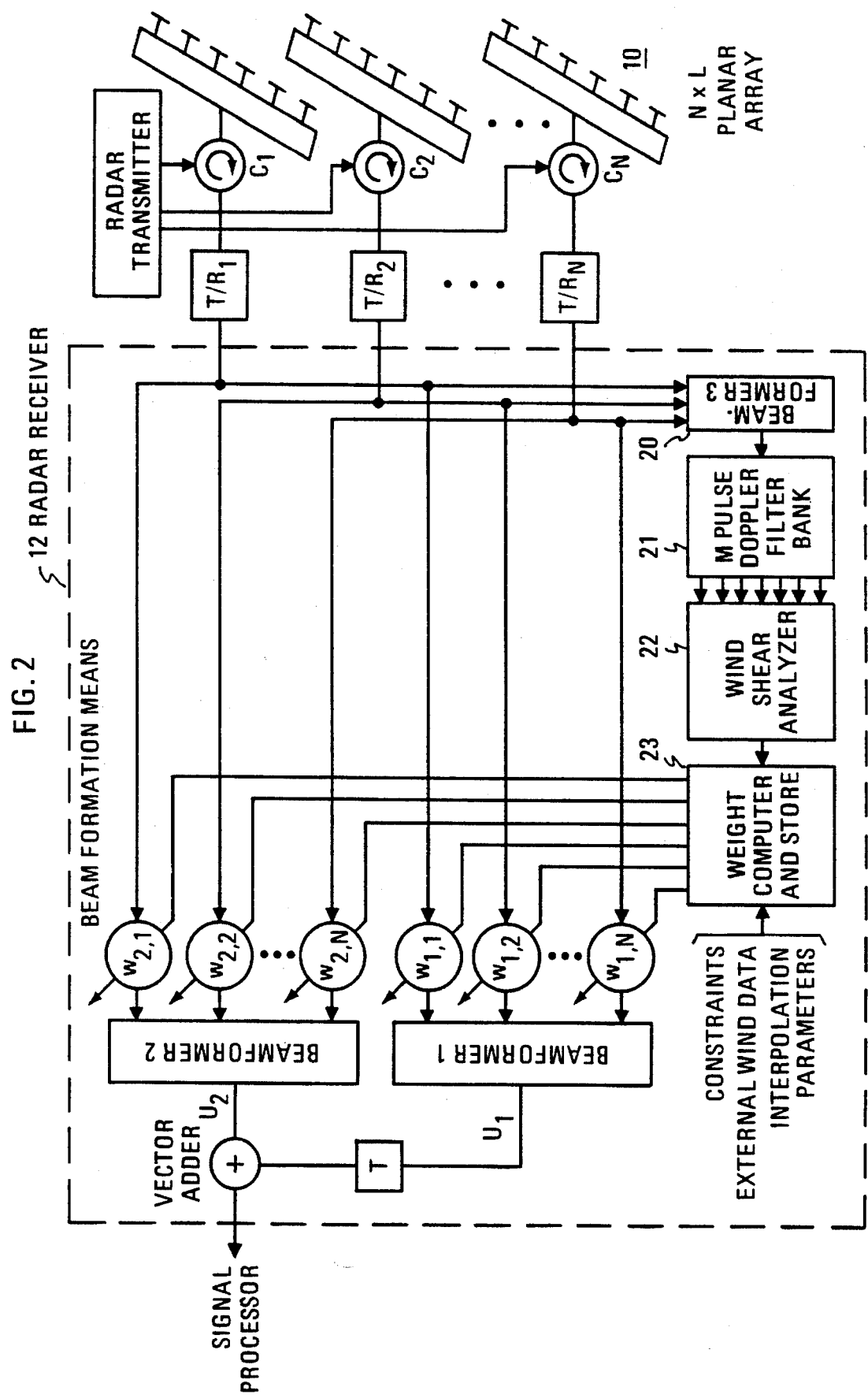
FIG. 2 is a block diagram of a portion of a radar system employing the wind shear compensation of the invention.
Figure 4:
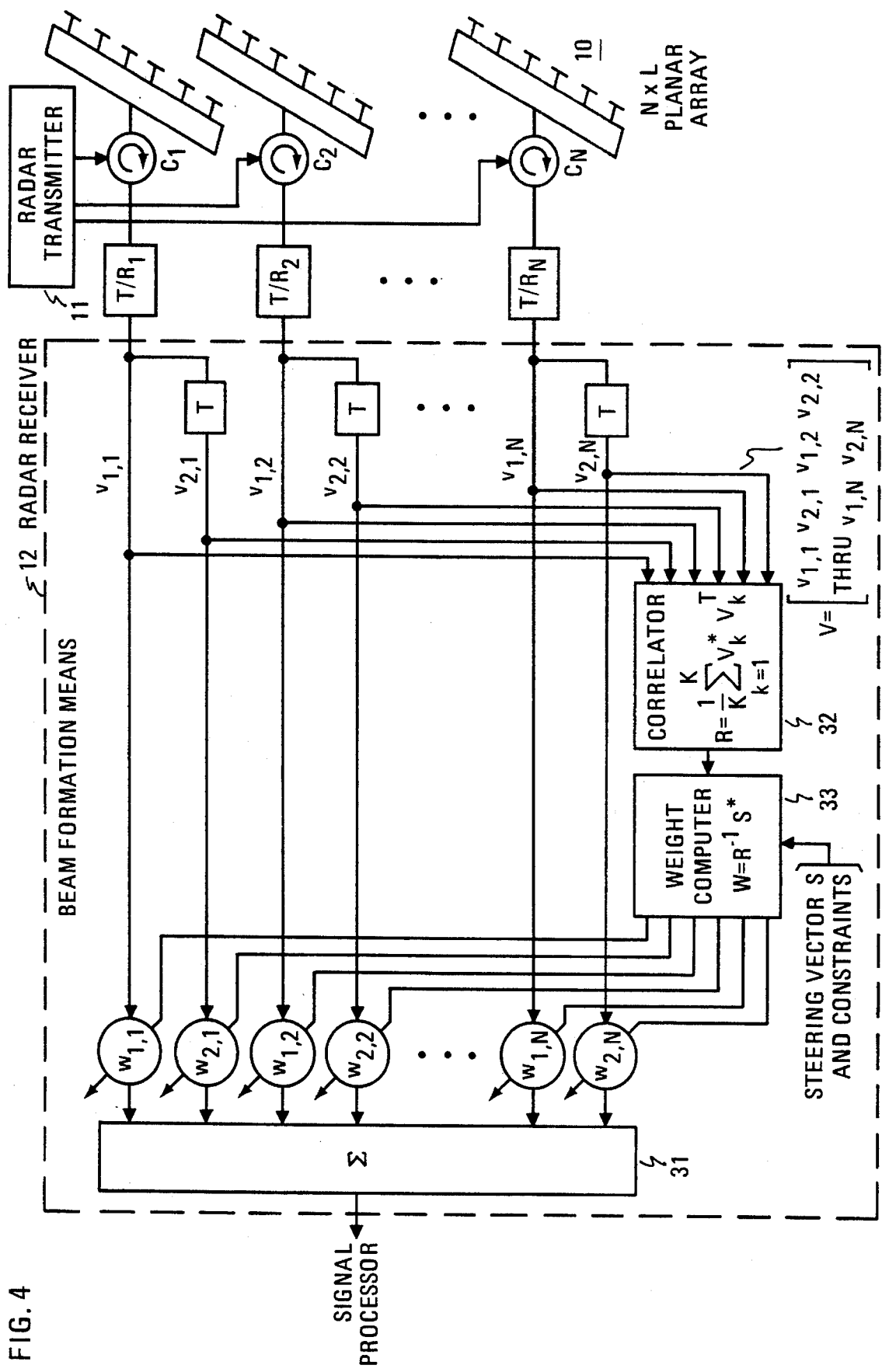
FIG. 4 is a diagram of a second embodiment of the invention in which an alternate means of weight computation for wind shear compensation is provided.

In the ideal, fully compensated adjustment of antenna motion for wind shear in an MTI system, the wind borne clutter at all elevation angles within the main beam is rejected by the weighted coherent combining of the current and once delayed pulses as indicated in FIGS. 2 and 4. Compensation disclosed here produces a null trough in the angle/doppler plane such that the wind sheared clutter lies in the trough. Targets sufficiently displaced from the trough and within the main beam will be detected. The compensation produces both the trough noted above and some adaptive reshaping of the beam pattern attributable in part to the reduction of the effective receive aperture Dealing with the issue more mathematically, the doppler spread across the mainbeam induced by array motion of S meters per second may be expressed as follows:

$$f_u - f_l = \frac{4S}{\lambda} \sin \frac{\beta}{2} \cos(\theta - \theta_l) \quad (3)$$

Similarly the Doppler spread due to wind shear may be expressed as follows:

$$f_u - f_l = \frac{-2kR}{\lambda} \sin\beta \cos 2\theta \quad (4)$$

where k=shear constant
and R=the observation range

The ratio, v, of this spread (equation (4)) to the non-ambiguous doppler range is $$v = |f_u - f_l|T \quad (5)$$

where $$T = \frac{2R_{max}}{c} = \text{pulse repetition interval} = \frac{1}{\text{non-ambiguous doppler frequency range}}$$

If we set $$T_a = \frac{2R}{c},$$

v may be expressed as $$v(T_a) = kT_a TF_o \sin\beta |\cos 2\theta|$$

where $F_o$=RF frequency.
At max range, $T_a$=T, and $$v_{max} = v(T) = kT^2 F_o \sin\beta |\cos 2\theta| \quad (6)$$

(values of $v_{max}$ were discussed at the outset of the discussion)

Since the effects of wind shear and array motion are additive, the total doppler spread from Equations (3) and (4) will be $$\frac{4S}{\lambda} \sin \frac{\beta}{2} \cos(\theta - \theta_T) = \frac{2kR}{\lambda} \sin\beta \cos 2\theta$$

Setting this equal to zero and solving for S, gives $$S = kR \cos \frac{\beta}{2} \frac{\cos 2\theta}{\cos(\theta - \theta_T)} \quad (7)$$

The distance, d, traveled by the antenna moving at S meters per second in an interpulse period is $$d = |S|T$$

or in terms of wavelengths, setting $$\frac{R}{\lambda} = \frac{cT_a}{2\lambda} = \frac{T_a F_o}{2}, \frac{d}{\lambda} = \frac{k}{2} T_a T F_o \cos \frac{\beta}{2} \frac{\cos 2\theta}{\cos(\theta - \theta_T)}$$

The required separation of the receive phase centers on the equivalent stationary array is 2d and the ratio of this distance to the array length D is $$\frac{2d}{D} = \frac{\frac{2d}{\lambda}}{\frac{D}{\lambda}} = \frac{2d}{\lambda} \sin\beta \quad (8)$$

$$= kT_a T F_o \sin\beta \cos \frac{\beta}{2} \frac{\cos 2\theta}{\cos(\theta - \theta_T)}$$

$$\frac{2d}{D} = v(T_a) \frac{\cos \frac{\beta}{2}}{\cos(\theta - \theta_T)}$$

Assuming identically weighted subarrays are used on the equivalent stationary array, the length, L, of each subarray is given by $$L = D - 2d$$

Hence, $$\frac{L}{D} = 1 - \frac{2d}{D}$$

Thus, 2d/D must be less than unity and, therefore, for complete compensation $$v(T_a) \leq \frac{|\cos(\theta - \theta_T)|}{\cos \frac{\beta}{2}} \quad (9)$$

The satisfaction of expression (9) denotes the possibility of very nearly complete cancellation of the clutter. In practical simulations the degree of improvement may be measured by the improvement factor $$IMPF = \frac{\frac{G_a}{RNR}}{\frac{G_u}{CNNR}} \quad (10)$$

where
$G_a$=peak gain of the compensated array over angle and doppler frequency
RNR=clutter plus noise-to-noise ratio of the compensated array
$G_u$=gain of the uniform array
CNNR=Clutter plus Noise-to-Noise Ratio in the uniform array The effect of motion of a linear array along the line of the array on pulse-to-pulse phase change can be simulated on a stationary array using the principle of DPCA (displaced phase center antenna).

Figure 5:
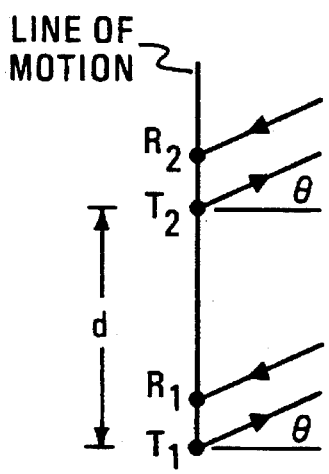
FIG. 5 contains two sketches explanatory of the synthesis of motion by displacing the phase centers of two subarrays of a stationary array.
Figure 5:
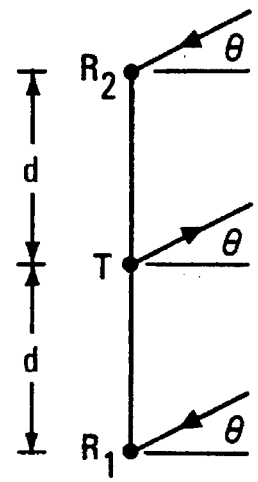

Consider a linear array (FIG. 5) in which the transmit and receive phase centers are co-located at the center of the array. The array is assumed to be vertical and moving upward along the line of the array. The left hand position of FIG. 5 shows the location of the array center at the transmit times, $T_1$, $T_2$, and receive times, $R_1$, $R_2$. Pulse 1 is transmitted when the array center is at $T_1$ and received at $R_1$, after scattering from a particle in the direction $\theta$ and at a range delay which allows the array center to move from $T_1$ to $R_1$ during the round-trip pulse flight time. Pulse 2 is transmitted when the array center is at $T_2$, d meters from $T_1$, and received at $R_2$, d meters from $R_1$. The round trip distance traversed by pulse 2 is 2d sin$\theta$ less than the round trip distance traversed by pulse 1.

Now consider the stationary array at the right hand portion of FIG. 5. Its transmit phase center, T, is at the center of the array and it has two receive subarrays, symmetrically positioned about the array center with phase centers, $R_1$, $R_2$, displaced 2d meters from each other. The first pulse is transmitted from T and received at $R_1$, the second pulse is transmitted from T and received at $R_2$. The round trip flight path for pulse 2 is 2d sin$\theta$ meters less than for pulse one which is the same result as obtained for the moving array of FIG. 1. Thus the phase difference of two successive pulses received on the moving array is the same as the phase difference of two successive pulses received on the stationary DPCA array, the first at $R_1$ and the second at $R_2$.

One may conclude that motion may be synthesized by displacing the phase centers of two subarrays of a stationary array.

Figure 1B:
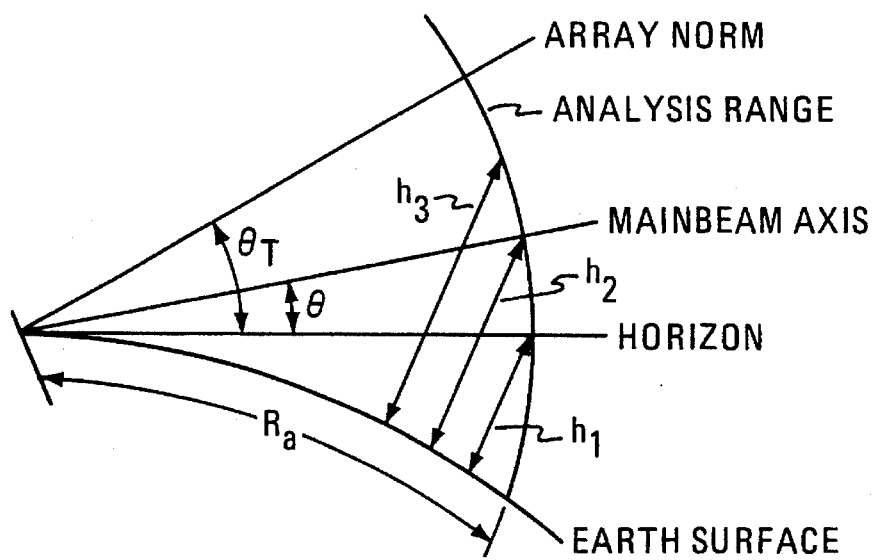

In simulating an optimum correction, different variables for the wind model may be employed. The wind model selected assumes the wind velocity is locally horizontal and a function of local height only. As illustrated in FIG. 1B, it may be seen that as the height varies along the constant analysis range, the ground range varies, and therefore the direction of the local horizontal.

The wind velocity consists of two components—a mean component which is constant with time but varies with height, and a turbulent component which varies with time but is statistically invariant with height. The mean component itself consists of three components and is represented as $$v_m(h) = V_g + kh + V_w(h) \qquad (11)$$

where h=height above the local ground $V_g$=wind velocity at the ground level towards or away from the radar k=effective wind shear constant, that is, the component of the total wind shear directed towards or away from the radar $V_w$=random component determined by a Wiener process.

Using the above model, and assuming that the wind velocity at ground level is 3 meters per second, that the wind shear constant is 4 meters per second per kilometer and that the Wiener random component and turbulence are zero, the improvement indicated by the "improvement factor" is 35 db. In the event that the Wiener random component is 1 (meter/second)$^2$/kilometer, then the projected improvement factor is reduced to 28 db. In the event that the turbulence of 1 meter/second is also introduced, then the projected improvement factor falls to 19 db. These values indicate that in many practical situations a very significant improvement will result.

The principles so far discussed may be carried out in a first embodiment of the invention which is illustrated in FIG. 2. FIG. 2 is a block diagram representation of a portion of a phased array radar system illustrating a planar array 10, the radar transmitter 11, the radar receiver 12 (shown within a dashed outline and containing internal elements), and circulators ($C_1$ to $C_N$) and transmit/receive devices (T/$R_1$ to T/$R_N$) which interconnect the radar receiver and the radar transmitter to the array. The signal processor and system control blocks of a complete radar system have been omitted.

The array 10 is capable of being electrically steered in elevation. It may be electrically or mechanically steered in azimuth or may be a stationary array. The array is normally operated at an inclined angle (typically 10 to 30 degrees to the vertical) and is designed to provide coverage of up to 360° in azimuth and from the horizontal to past the zenith (i.e. 120°) in elevation. In the practical embodiment, the array has 44 horizontal rows of elements aligned in a comparable number eg. (36) of vertical columns.

The connections between the radar transmitter 11 and the rectangular array 10 are conventional and have been symbolized without being shown in detail. Similarly the connections of the radar receiver to the array are conventional, and have been shown symbolically. In particular, the elements in each horizontal row of the array are weighted, phase shifted and then summed to form a row output. Each row is separately connected via a circulator and a T/R device to a separate receiver input. A circulator and a T/R device are provided for each array connection to isolate the receiver from the transmitter output during transmission and to permit efficient coupling of received signals from the array to the receiver (without loss into the transmitter port) during reception.

The radar transmitter 11 is designed for moving target indication (MTI). It transmits a phase-coherent train of pulses (typically between 8 and 32) of short duration (typically between 1 and 5 micro-seconds) amplitude modulated upon a constant high frequency (typically between 400 MHz and 25 gHz) carrier. The intervals between pulses are of equal duration, and are dependent upon the maximum range setting of the radar at the time.

The radar receiver 12, the beam formation means for which are shown in FIG. 2, comprises a first group of N complex weight multipliers ($w_{1,1}$, $w_{1,2}$, . . . , $w_{1,N}$), whose outputs are coupled to a first beamformer 13, a second group of N complex weight multipliers ($w_{2,1}$, $w_{2,2}$, . . . , $w_{2,N}$), whose outputs are coupled to a second beamformer 14, a time delay T coupled to the output of the first beamformer (13), a vector adder 15 coupled to the output of the time delay T, and to the output of the second beamformer 14 for combining the delayed output of the first beamformer with the undelayed output from the second beamformer 14, and the elements 20, 21, 22 and 23 associated with computing the weights. Not pictured, but essential parts of the radar receiver, are mixers at the input in each of the input lines for converting the input signal to an intermediate frequency suitable for further amplification, the local oscillators which are associated with the mixers, and intermediate frequency amplifiers which amplify the intermediate frequency signal to a level suitable for signal processing.

The 1 to N outputs (of the I.F. amplifiers) from the array, are coupled respectively to each signal input of the first group ($w_{1,1}$, $w_{1,2}$, . . . , $w_{1,N}$) of weight multipliers, and are branched and coupled to each signal input of the second group ($w_{2,1}$, $w_{2,2}$, . . . , $w_{2,N}$) of weight multipliers. The output of the vector adder 15, which may be regarded as the output of the radar receiver, is a composite "beam" representing the vector addition of the delayed and undelayed beams, in which, when the weights are properly computed in 20, 21, 22 and 23, the wind shear driven clutter is greatly attenuated over that present in either beam formed in 13 or 14 and a receiver output signal with reduced clutter is coupled to the signal processor of the radar system for further processing.

The array patterns corresponding to the $W_1$ or $W_2$ weighting, (which apply to the embodiments depicted in both FIGS. 2 and 4), are illustrated in FIGS. 3A through 3E. Illustrations of the beams in vertical beam angle/doppler frequency space, are provided in FIGS. 3F through 3H.

Figure 3A:
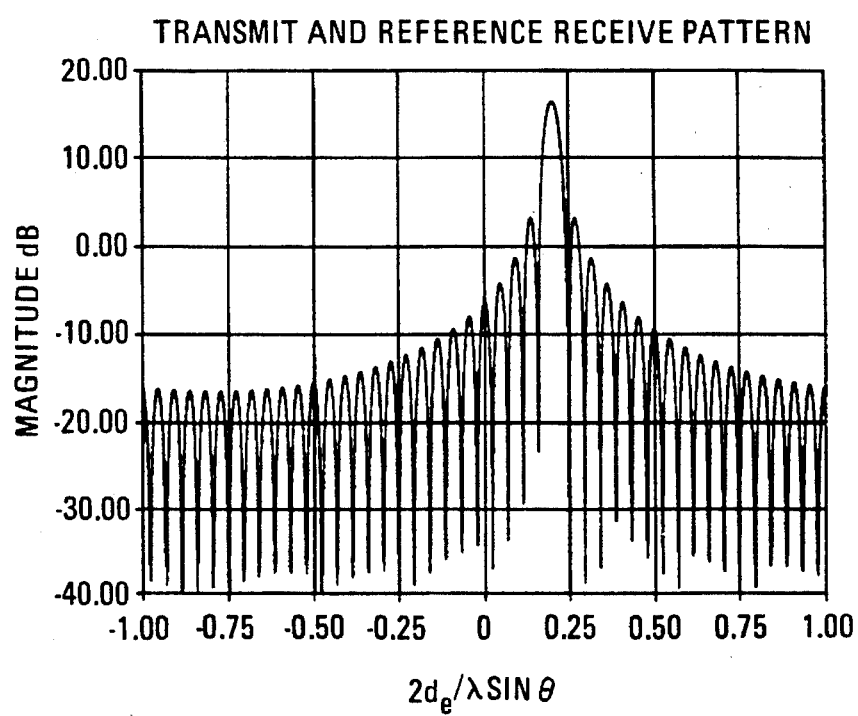
FIGS. 3A through 3H are graphs explanatory of the operation of the invention.
Figure 3B:
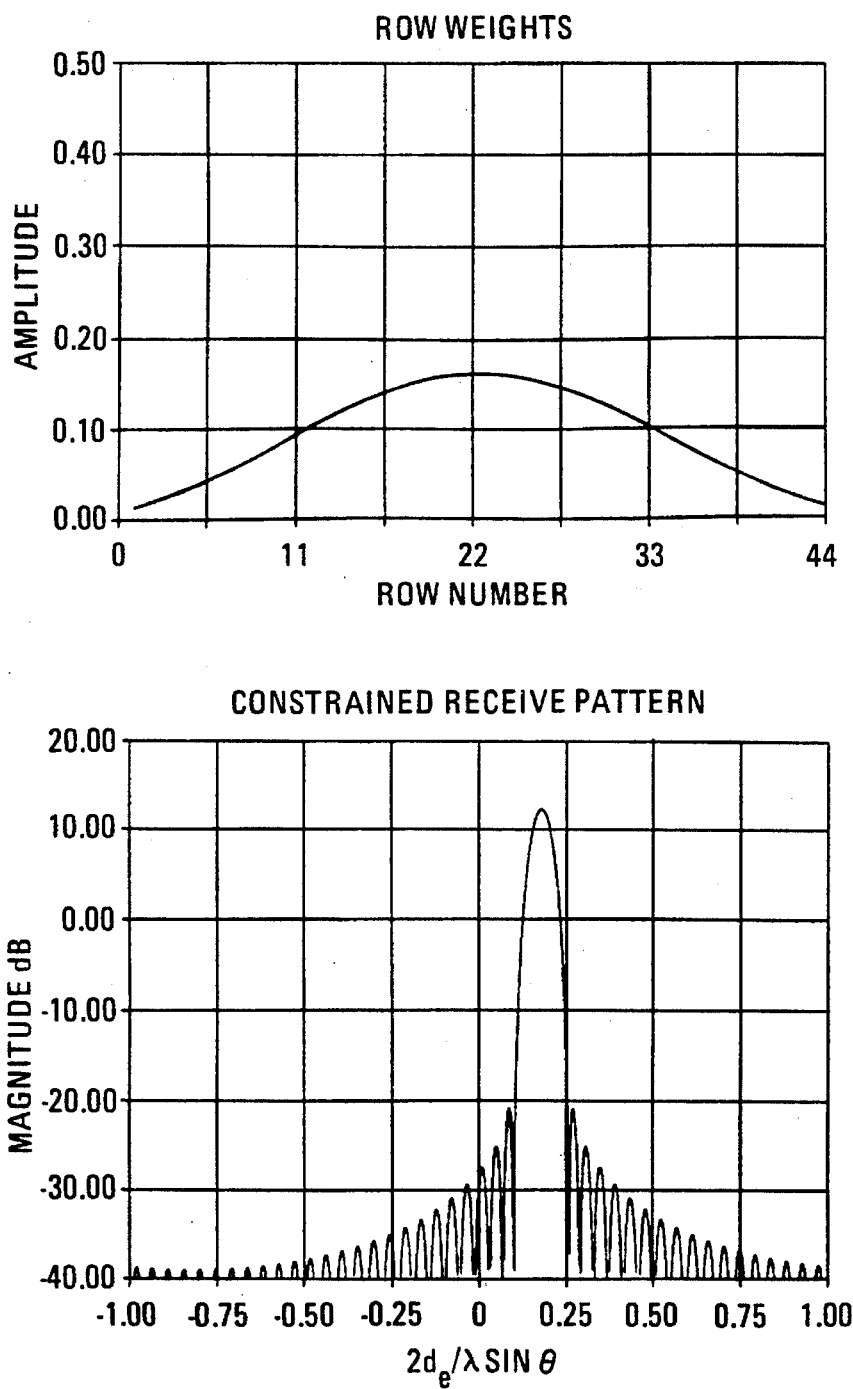

The unconstrained array pattern is shown in FIG. 3A, ($N=44$, $d/\lambda=0.73$, equal weights; and the beam steered to a 3° elevation angle). The gain of the principal lobe is 16.4 dB above the gain of a single row. In FIG. 3B, the weights obtained, when a sidelobe constraint is applied, are shown. The resulting pattern is also shown in 3B. (The weights are normalized for two outputs per channel resulting in a 3 dB reduction over the pattern.) The result is a large reduction in side-lobes and a 1.1 dB drop in gain of the main lobe relative to the uniformly weighted array.

In a simulation conducted to evaluate the performance of the clutter compensation technique, wind borne clutter was represented by discrete sources every 0.1 km from the horizon up to a maximum height of 12 km, all at 100 km range. The sources had equal power such that the clutter-to-noise ratio at the output of the uniformly weighted array was 34.91 dB. The performance of the clutter compensation arrangement was measured by the improvement factor defined earlier, (Expression 10)

$$IMPF = \frac{\frac{G_a}{RNR}}{\frac{G_u}{CNNR}}. \qquad (10)$$

Figure 3C:
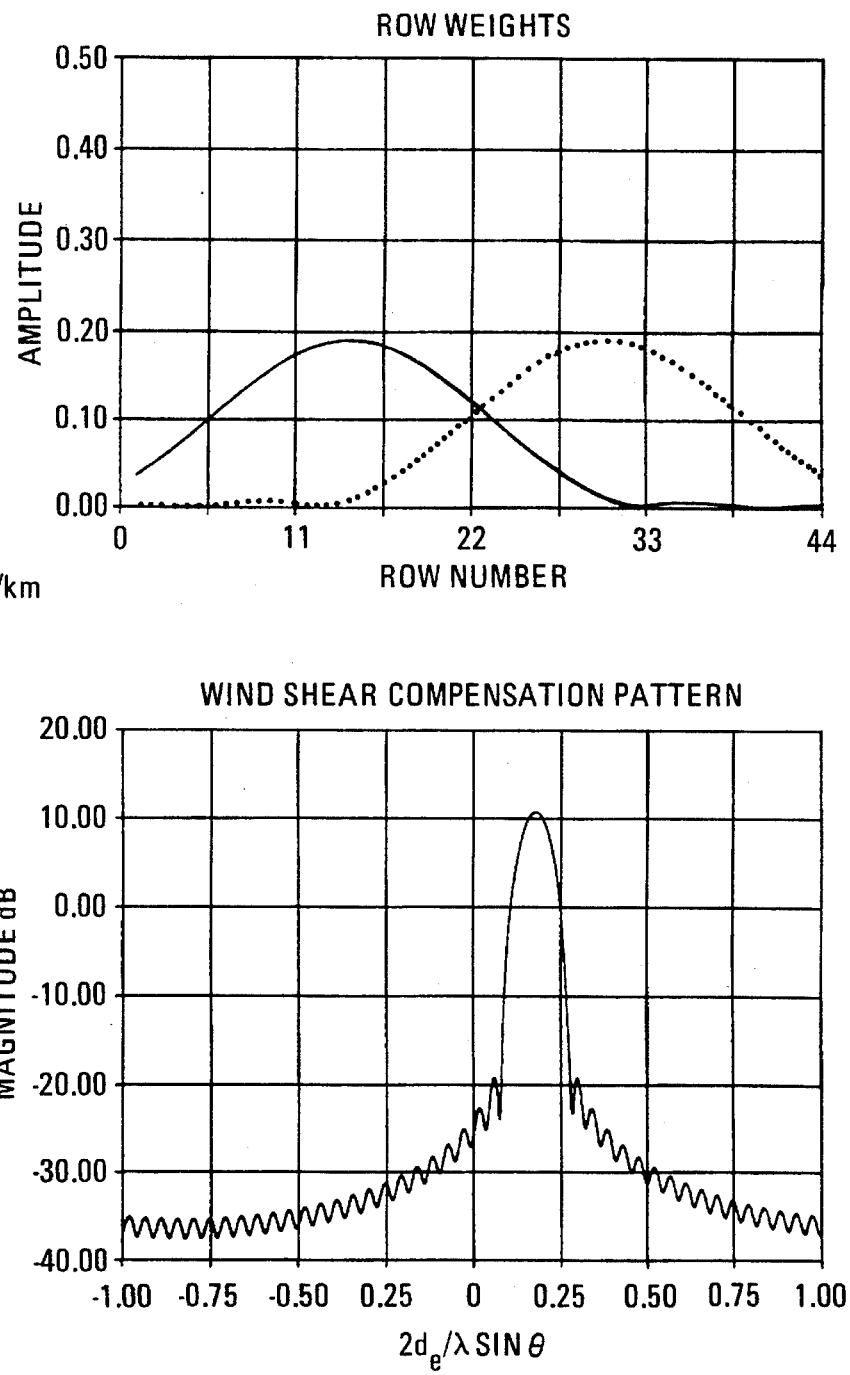
Figure 3D:
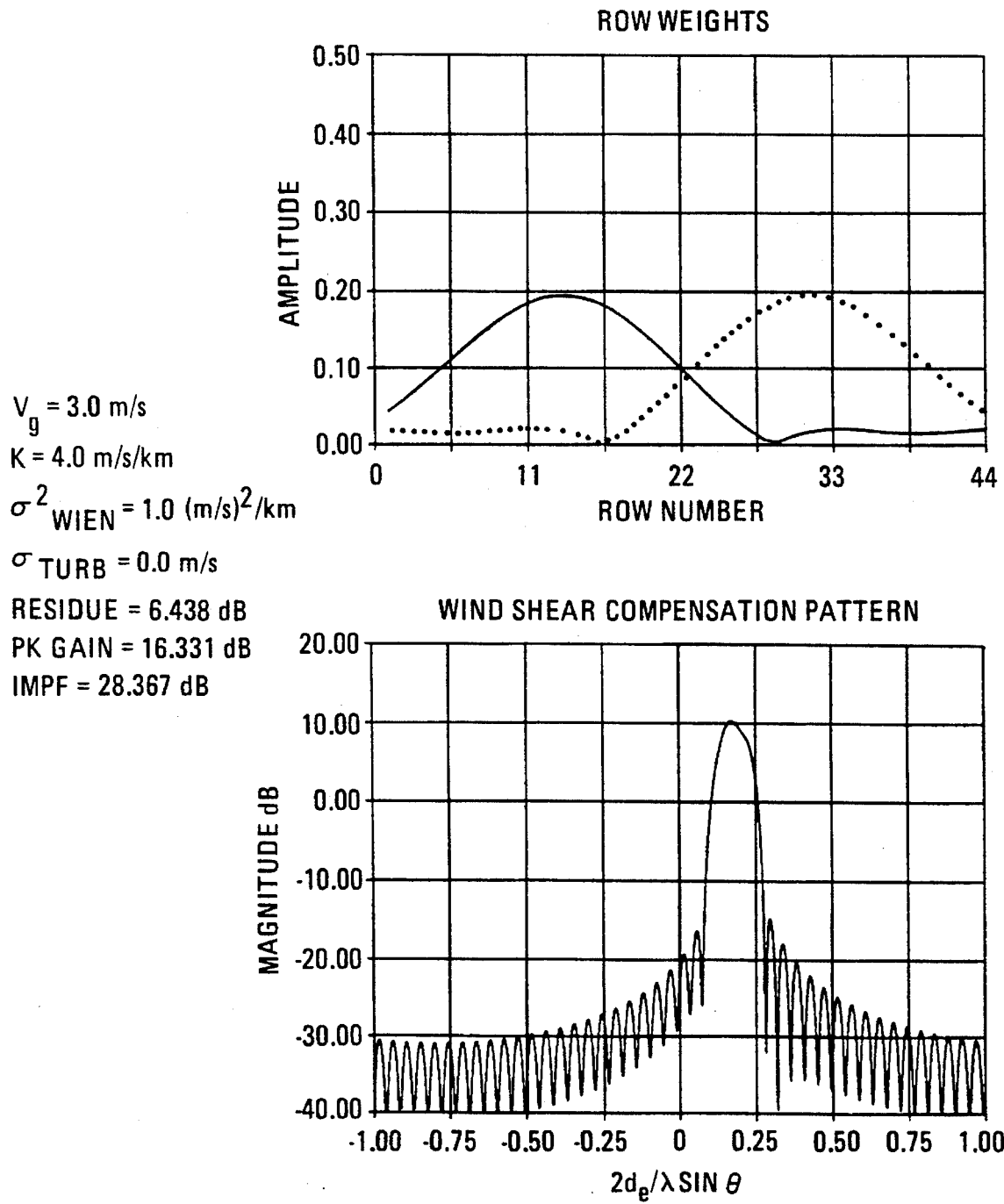
Figure 3E:
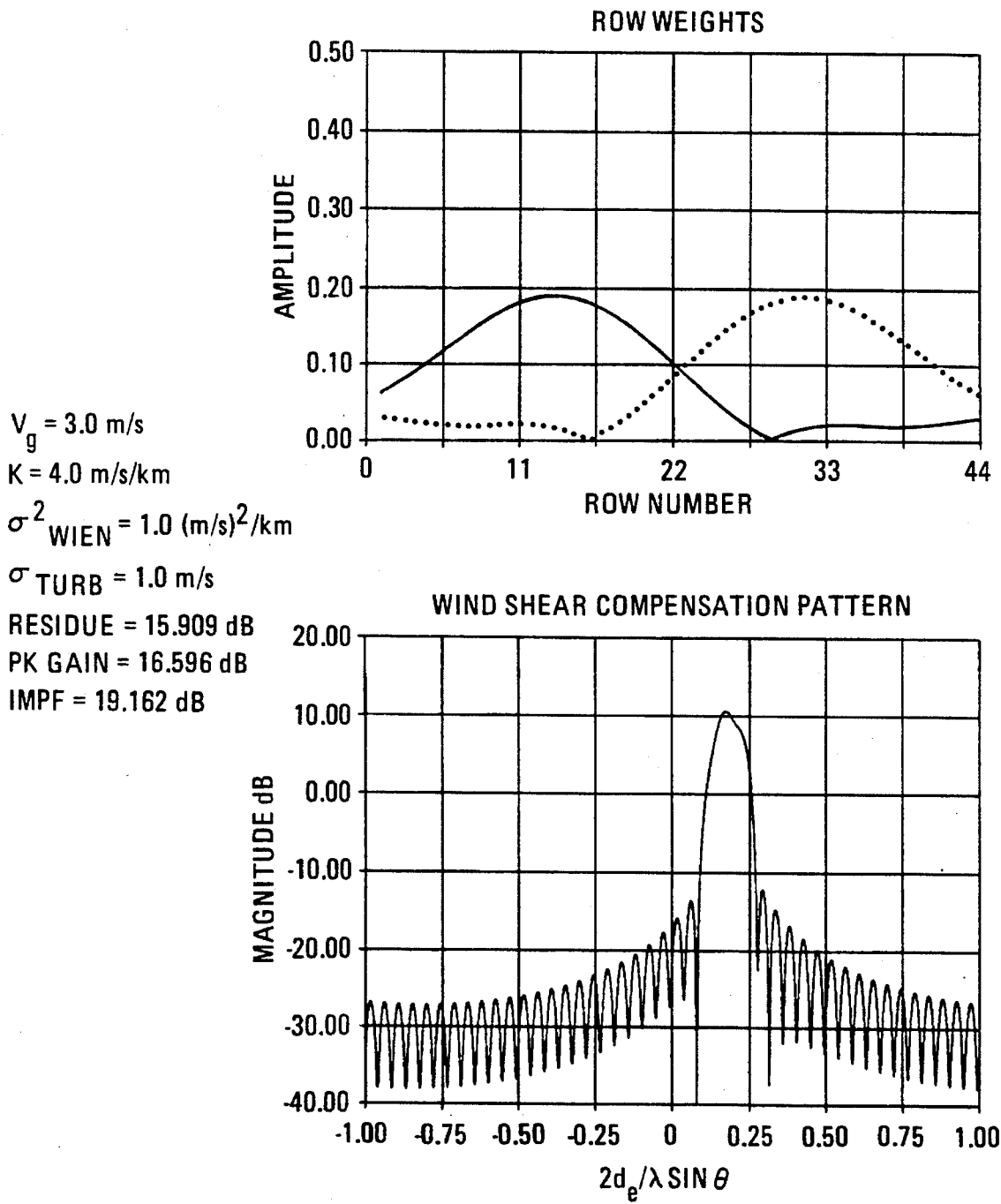

The projected results obtained for stated variations in the parameters of the wind model are illustrated in FIGS. 3C, 3D and 3E. In 3C an improvement of 35 dB is projected using a model in which the wind shear (k) is 4 m/s/km starting with a ground value of 3 m/s, and other components are negligible. In FIG. 3D, an improvement of 28 dB is projected assuming a random Wiener wind of 1 (m/s) $^2$/Km. In FIG. 3E, an improvement of 19 dB is projected assuming both the random Wiener wind of the prior example and a 1 M/S turbulence component.

Figure 3F:
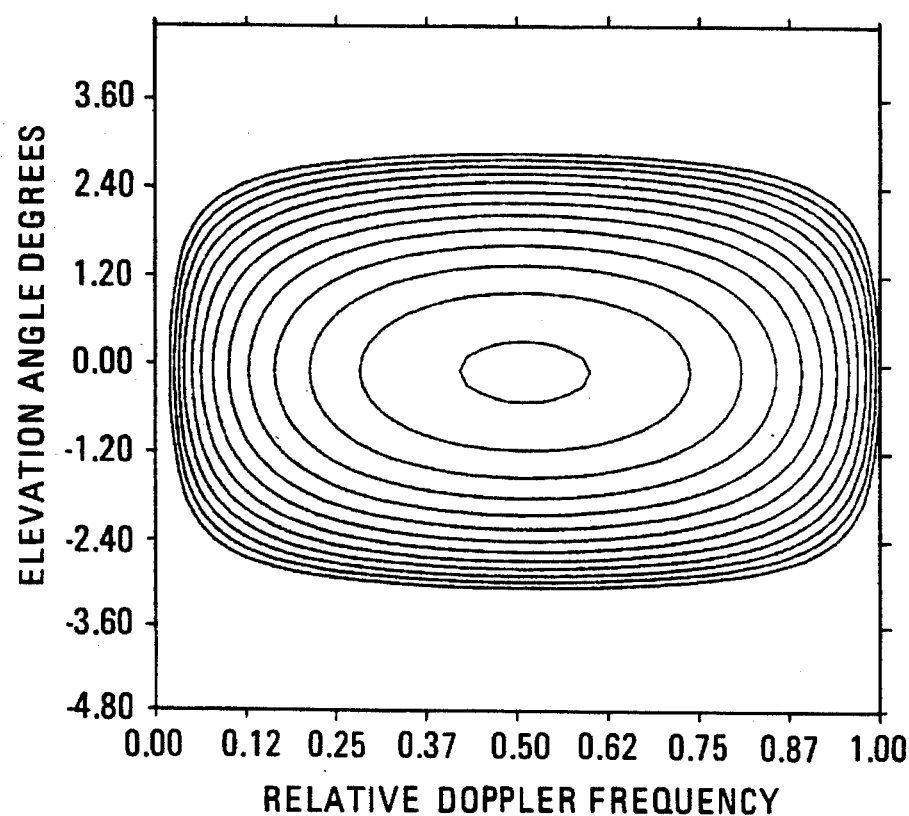
Figure 3G:
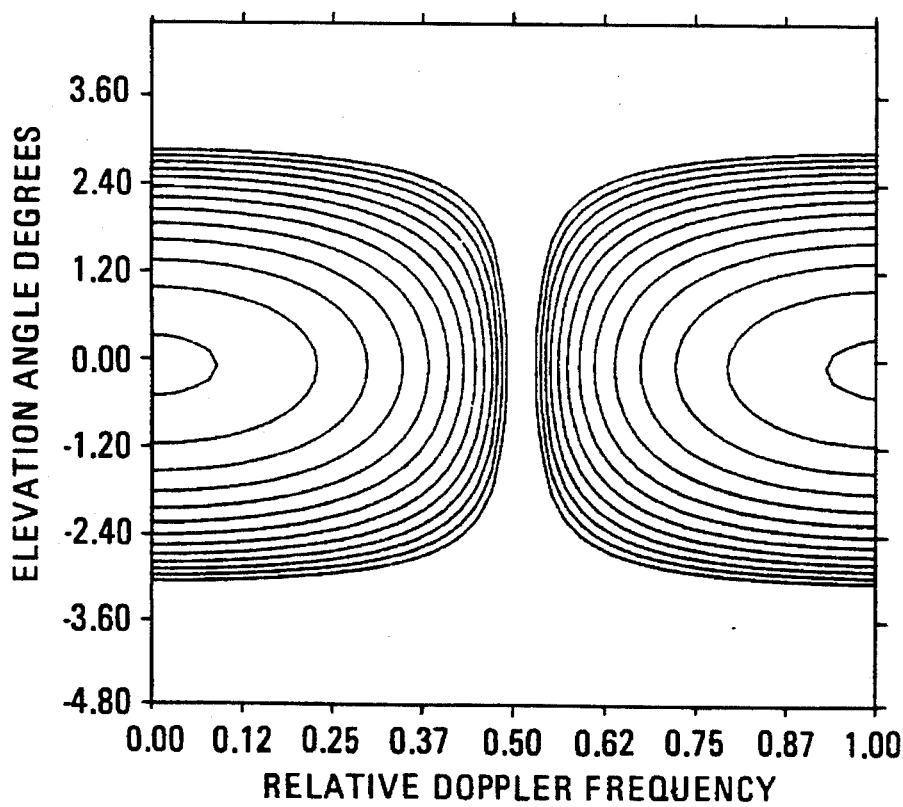
Figure 3H:
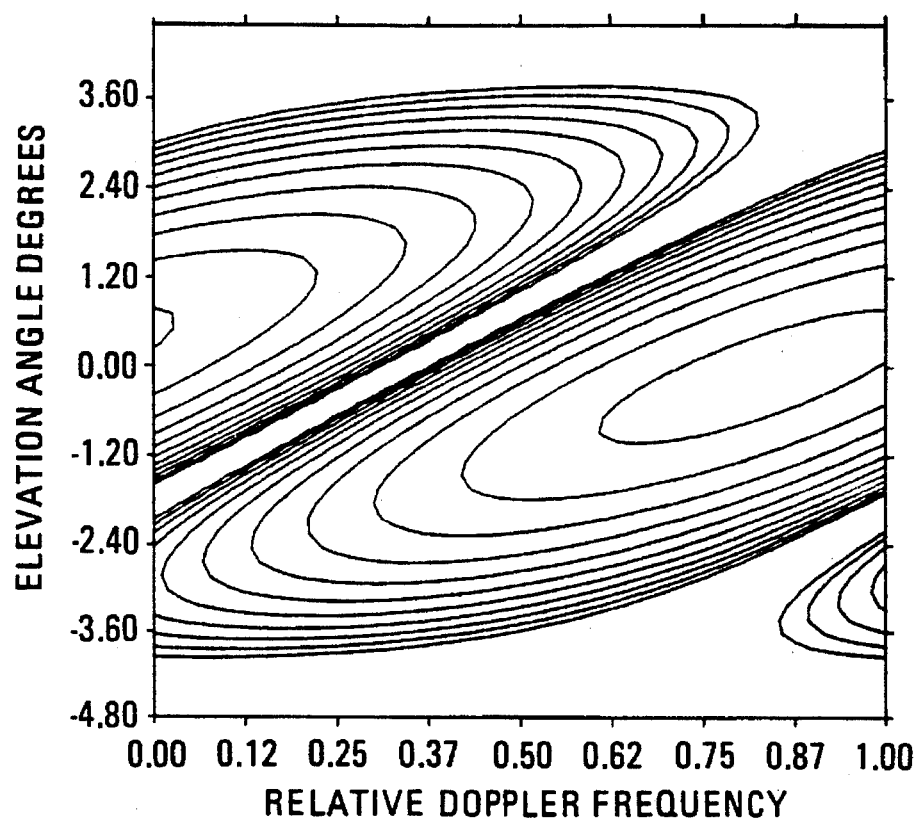

The response of the radar system in clutter compensation is perhaps best illustrated by the response of the system presented in elevation angle/doppler frequency space as provided in FIGS. 3F, 3G and 3H. The contours represent constant responses in dB. In FIG. 3F, the peak response occurs where the elevation angle with respect to the beam center is 0.00 and the relative doppler frequency is 0.050, (measuring doppler frequency between 0 and 1.0 relative units).

The contours in FIG. 3F, occur at 2 dB intervals, the center (highest) being +18 dB and the outside (lowest) being −6 dB. The response represents a conventional selection of doppler filtering that maximizes the response to a target with a relative doppler frequency of 0.50 (±an integer). This response would reject targets or clutter at 0.00 (or 1.00) relative doppler frequency.

FIG. 3G shows a conventional response where the doppler filtering is designed to peak at 0.00 relative doppler frequency. With this filter, any interference occurring within the relative doppler coordinates (0.50±0.02) of the trough would be subjected to an up to 22 dB differentiation from a target on the beam axis but out of the trough. In the event that a wider range of doppler frequencies is to be rejected, then additional filtering would be provided to bring this about.

If, as in FIG. 3H, clutter is subject to substantial wind shear, doppler filters at fixed frequencies must be very wide. In the example, the clutter has a (relative) doppler value of approximately 0.35 on the beam axis, a doppler value of about 0.10 at the bottom edge of the beam (−1.20 degrees) and a doppler value of about 0.55 at the top edge of the beam (+1.20 degrees). In this case, a conventional doppler frequency filter employed to eliminate interference, would have a widened trough designed to suppress the doppler range from 0.010 to 0.55 (which is almost half the available unambiguous doppler frequency range). However, if the wind shear clutter reduction arrangement of the present invention is employed, the full doppler range remains essentially available for signal capture. As shown in FIG. 3H, only a narrow trough is created, set at an angle optimized for wind shear reduction in the angle/doppler space of the graph. Signals lying in the trough will of course be attenuated and those to either side of the trough passed. However, the trough is a narrow one tailored to the parameters of the shear. In particular, the trough need not span the full doppler range that the beam responds to, but only the doppler values at successive vertical elements of the beam approximated by the clutter. Clutter rejection (e.g. 20 dB minimum in the example) occurring in the trough, is the same, or may be made the same as in conventional MTI rejection filters. The shape of the beam is, of course, deformed, but it retains an improved ability to detect targets throughout the doppler frequency range affected by the wind shear.

The wind shear compensation of the present invention will only suffer from target obscurrence by clutter, where the target is at the same position as the clutter in real space (.or within the narrow trough adaptively formed in the beam for clutter compensation) and where the target has the same doppler frequency as the clutter.

A computation of the weights depicted in FIGS. 3B through 3E under the varying conditions to achieve the compensation of wind shear driven clutter is performed by the elements 20, 21, 22 and 23 of the beam formation means. A third branch is provided at the input of each of the 1 to N receiver input channels for connection in a predetermined-weighted state to the 1 to N input channels of the integration network 20 used to form a beam for clutter compensation. The output of the integration network is coupled to an M pulse doppler filter bank 21. The filter bank is designed to provide M overlapping doppler channels across the unambiguous doppler interval. The summer 20 similar to the beamformers 13, 14 is designed to form a complex summation of the applied signals at the IF frequencies in question, and thereby form a virtual beam.

The output of the filter bank 21 thus provides a succession of values for application, preferably in a sampled state, to the wind shear analyzer 22. The samples are a succession of values, substantially simultaneous in time, representing the component of clutter power present in each doppler channel in their range resolution cell. In the presence of clutter due to weather borne particles or chaff, the clutter may appear in from one to all of the doppler channels.

In the event that the clutter appears in one doppler channel, that channel will indicate the velocity of the chaff, and a conventional notch filter solution is indicated having the properties indicated in FIG. 3F or 3G. In the event that the clutter falls into several doppler channels, then wind shear is indicated at the observed velocities between the lower and upper limits of the radar beam in the range resolution cell.

The coordinates of the sample, including the altitude at the upper and lower limits of the range resolution cell are calculated in the analyzer. The analyzer 22 utilizes a linear model of wind shear similar to expression (11) but omitting the random Wiener component and the turbulence, namely, $$V = V_o + kR\phi\cos\theta \tag{12}$$

where $\theta$ = elevation angle of the beam axis $\phi$ = the elevation displacement angle in radians from the beam axis V = the radial component of the wind velocity at elevation angle $\theta + \phi$ at range R $V_o$ = the radial component of the wind velocity at the beam axis at range R k = wind shear constant The doppler frequency corresponding to V is $$f_d = \frac{2V}{\lambda} \cos(\theta + \phi) \tag{13}$$

$$\approx f_o + \frac{2kR\cos^2\theta}{\lambda} \phi$$

where $$f_o = \frac{2V_o}{\lambda} \cos\theta$$

is the doppler frequency at the beam axis.

The power outputs of the bank of doppler channels may be considered to be samples of a clutter distribution function, $H(f_d)$, defining the distribution of clutter power as a function of the doppler frequency. $H(f_d)$ is determined by the distribution of the clutter across the main beam, the wind shear, and the product of the elevation power patterns on transmit and receive, $G_T(\gamma)$ and $G_R(\gamma)$ respectively, where $$\gamma = \frac{\pi D}{\lambda} \{\sin(\theta + \phi - \theta_T) - \sin(\theta - \theta_T)\}$$

(D is the vertical dimension of the antenna)

For small $\phi$, (within the main beam), $$\gamma \approx \frac{\pi D}{\lambda} \phi \cos(\theta - \theta_T) \tag{14}$$

$\gamma$ may be related directly to the doppler frequency with the aid of expression (13), $$\gamma = \frac{\pi D \cos(\theta - \theta_T)}{2kR\cos^2\theta} (f_d - f_o) \tag{15}$$

Assuming the main beam is uniformly filled with clutter leads to the relation $$H(f_d) = \text{constant} \cdot G_T(\gamma) G_R(\gamma) \tag{16}$$

The values of k and $f_o$ may be determined from expression (16) by various well-known methods. For example, k and $f_o$ may be chosen to give the least mean square difference between the measured $H(f_d)$ and the right hand side of (16).

Alternatively k anf $f_o$ may be chosen so that the first and second moments of both sides of (16) agree. If $G_T(\gamma)$ and $G_R(\gamma)$ are symmetric, the mean value of $f_d$ determined from the right hand side of (16) is $f_o$ and therefore the mean value determined by $H(f_d)$ must be $f_o$. Thus $$f_o = \frac{\int f_d H(f_d) df_d}{\int H(f_d) df_d} \tag{17}$$

The value of k may be determined from the second moments of (16). The result may be expressed as $$\frac{2kR\cos^2\theta}{\pi D \cos(\theta - \theta_T)} = \frac{\sigma_H}{\sigma_G} \tag{18}$$

where $$\sigma_H^2 = \frac{\int (f_d - f_o)^2 H(f_d) df_d}{\int H(f_d) df_d}$$

and $$\sigma_G^2 = \frac{\int \gamma^2 G_T(\gamma) G_R(\gamma) d\gamma}{\int G_T(\gamma) G_R(\gamma) d\gamma}$$

Combining, and assuming a narrow main beam, leads to an expression for the required separation of the phase centers of beams 1 and 2, $$\frac{2d}{D} = \frac{\pi T \sigma_H}{\sigma_G} (1 - \tan^2\theta) \tag{19}$$

Knowledge of 2 d/D and $f_o$ is sufficient to determine the weights $w_{1,1}, \ldots, w_{2,N}$. The weights are determined from information received on one or more previous scans and stored in the computer 23.

The weight computer 23 generates the succession of weights required to create the trough in the beam formed in the principal beam forming summer 13. As noted earlier, this is achieved by forming two electrical beams in the plane of the array which are mutually displaced in an upward or downward direction, at an absolute displacement to fit the doppler value and the beam axis at the vertical velocity (meters per second) required by the doppler spread (expression 15) between beam limits to obtain the correct orientation of the trough in beam angle/doppler frequency space to attenuate the clutter.

The weighting may be obtained by an alternate, adaptive, technique illustrated in FIG. 4. FIG. 4 is a block diagram representation of alternate beam formation means for the radar receiver 12. The external connections are as before, with the radar receiver being provided with 1 to N input connections each of which lead via IF amplifiers, mixers, T/R devices and circulators to the rows of the planar array.

The signals $(v_{1,1}, v_{1,2}, \ldots, v_{1,N})$ at the input to the receiver are each coupled undelayed to one input of the weighting multipliers $(w_{1,1}, w_{1,2}, \ldots, w_{1,N})$. The same 1 to N input signals are branched to form a second plurality of signals $(v_{2,1}, v_{2,2}, \ldots, v_{2,N})$, each of which is coupled via time delay (t) to the weighting multipliers $(w_{2,1}, w_{2,2}, \ldots, w_{2,N})$. The outputs of the multipliers are then combined in a single beam forming summer 31 to form a composite beam having a response in beam angle/doppler frequency space of the same type illustrated in FIGS. 3F through 3H. The weighting which produces correct weights is performed by means of the correlator 32 which is supplied by inputs derived from each of the input lines (providing undelayed and delayed signals) to the weight multipliers, and the weight computer 33 which computes the weights from data obtained in part from the correlator 32.

The correlator, as will be described below, obtains a value for "R" from the signal samples. "R" is a sample covariance matrix of the totality of array outputs obtained by averaging pairwise products of the array outputs. This may be expressed mathematically as $$R = \frac{1}{K} \sum_{k=1}^{K} V^*_k V_k^T \tag{20}$$

where $V_k$ is the vector of 2N array outputs obtained on the kth measurement. $V^*_k$ is the complex conjugate of the vector $V_k$ and $V^T_k$ is the transpose of the vector $V_k$. The k measurements that are averaged in Expression (20) are obtained over range or from scan to scan or both. The output "R" from the correlator 14 is supplied to the weight computer 14, and the quantity S*, which is the complex conjugate of the steering vector, that shapes and steers the beam in angle/doppler space, is coupled to the weight computer.

The sample matrix R obtained by averaging pairwise products as indicated by Expression (20) may be modified in the weight computer 33, so as to produce desirable effects on the weight vector w and upon the output beam obtained in 31. For example the level of the sidelobes of the output beam produced in 31 may be unstrained by adding to the R obtained by measurement, an R' simulating the effect of interference in the sidelobe region. This will reduce the level of sidelobes in the output beam.

The shape of the output beam may also be controlled by choice of the steering vector S. For optimum signal to noise-plus-clutter ratio, the components of the vector S should be proportional to the expected voltages, amplitude and phase, produced by a signal source in a given direction with a given radial velocity. However, the amplitudes of the components of S may be tapered to produce a general lowering of the sidelobe levels of the output beam. In applying the disclosed invention to a monopulse radar, an elevation difference beam, free of clutter, may be produced by using for the vector S a vector designed to produce a difference beam.

The weight computer computes the weights from the formula $$W = R^{-1} s^* \quad (21)$$

and supplies the weights to each weighting multiplier.

The 2N signals, after weighting in the 2N complex weight multipliers ($w_{1,1}, \ldots, w_{2,N}$) are coupled to the summation network 31 as noted earlier. The summation network 31 combines the weighted radar data to form the composite beam in which the wind shear driven clutter is greatly reduced. The composite beam is now ready for coupling to a signal processor.

The operation of the correlator 14 and weight computer 15 may be treated in additional detail. The correlator derives the covariance matrix R of the 2N signal outputs, two from each of the N receiver input channels. When the rows of the arrays are identical and equally spaced vertically, the covariance matrix R can be arranged as a block Toeplitz matrix consisting of N 2×2 sub-matrices (blocks). As a result of the Toeplitz property, the covariance matrix is completely determined by the first row of blocks. The blocks are a function of the power, location, mean velocity and turbulence of the sources that represent the clutter. The covariance matrix can be inverted efficiently, because of the block Toeplitz structure, to obtain values for $W_{opt}$ from formula 18. As noted more succinctly above, S is the 2N×1 steering vector which designates the spatial angle and doppler of the potential target direction for which the Signal-to-Clutter plus Noise Ratio (SCNR) is to be maximized.

When R has not a block Toeplitz structure as when the rows are not identical or not equally spaced vertically, the sample covariance matrix can be inverted by a more general matrix inversion algorithm.

What is claimed is:

1. A moving target indicating radar system in which the adverse effect of wind shear driven clutter is reduced with a minimum reduction of the usable doppler frequency spectrum, the combination comprising:

A. a radar antenna array comprising a plurality of radiating elements disposed in a common plane and arranged in horizontal rows and vertical columns;

B. means for phase shifting, weighting, and summing elements in each row;

C. a first and second summation means for forming respectively a first and a second receiving beam from said array, each beam formed by weighting the outputs from rows of the array by adjustable complex weights and then summing the weighted outputs, the main lobes of the two beams so formed being parallel but originating from mutually vertically displaced phase centers in said array;

D. means for delaying one of said beams a predetermined time in relation to the other beam and adding them algebraically to form a composite beam containing a narrow trough-like depression in vertical beam angle/doppler frequency space where vector cancellations occur;

E. 1. means for determining the radial velocity component of wind shear and the differential radial velocity component due to wind shear between the upper and lower limits of the beam at the range resolution/angle resolution cell under examination to determine the position of said clutter in vertical beam angle/doppler frequency space, and 2. means for adjusting said weights in response to said determination to achieve an appropriate mutual vertical displacement of said phase centers to cause said trough-like depression to coincide with said clutter in vertical beam angle/doppler frequency space for optimum cancellation of said clutter with a minimum reduction in the usable doppler frequency domain.

2. The combination set forth in claim 1 wherein said means (E) further comprises:

third summation means for forming a third beam from said array coupled to said means (E)1, said means (E)1 determining the radial velocity components of wind shear at the center of said third beam and the differential radial velocity component due to wind shear between the upper and lower limits of said third beam.

3. The combination set forth in claim 2 wherein said means E further comprises:

a means for adjusting said weights to mutually displace the phase centers of said beams to cause said trough to assume the desired angular orientation in beam angle/doppler frequency space for optimum cancellation.

4. The combination set forth in claim 3 wherein said means E further comprises:

an M pulse doppler filter bank in which the third beam is sampled in the doppler domain to determine the doppler frequency at the beam center and the effective wind shear across the beam.

5. The combination set forth in claim 4 wherein:

said means (E) forms said second receiving beam by use of the complex conjugate mirror images of the complex weights used in forming the first receiving beam, neglecting a phase constant.

6. A moving target indicating radar system in which the adverse affect of wind shear driven clutter is reduced with a minimum reduction of the usable doppler frequency spectrum, the combination comprising:

A. a radar antenna array comprising a plurality of radiating elements disposed in a common plane and arranged in horizontal rows and vertical columns;

B. means for phase shifting, weighting and summing elements of each row;

C. means for obtaining the undelayed sum output of each row as well as the sum output of each row, delayed in time by a predetermined amount;

D. means for obtaining the sample covariance matrix of the outputs, delayed and undelayed of all rows, said sample covariance matrix consisting of elements which are the arithmetic average of the products of the row outputs by pairs; and E. means for inverting the sample covariance matrix, and multiplying the conjugate of a steering vector S by the inverse to obtain a weight vector W; and F. means for forming a beam from the delayed and undelayed row outputs by weighting these outputs by the components of W, and summing.

7. The combination set forth in claim 6 wherein:

said means (D) comprises means for averaging said products of the row outputs by pairs over an interval of range close to the range cell of interest in the same angle cell, or by outputs from the same range cell taken from scan to scan, or both.

* * * * *